United States Patent [19]
Betsinger

[11] Patent Number: 4,782,748
[45] Date of Patent: Nov. 8, 1988

[54] MOBILE SCRAP SHEAR MACHINE

[76] Inventor: Thomas R. Betsinger, 407 Fourth Ave., South, Onalaska, Wis. 54650

[21] Appl. No.: 123,307

[22] Filed: Nov. 20, 1987

[51] Int. Cl.⁴ .......................... B30B 9/32; B30B 15/30
[52] U.S. Cl. ..................................... 100/95; 100/98 R; 100/100; 100/215; 100/901; 280/766.1; 212/189
[58] Field of Search ................. 100/215, 100, 95, 901, 100/98 R; 280/763.1, 766.1; 212/189

[56] References Cited

U.S. PATENT DOCUMENTS

| | | | |
|---|---|---|---|
| 3,413,914 | 12/1968 | Ballard | 100/901 |
| 3,554,119 | 1/1971 | Schoellhorn | 100/215 |
| 3,745,916 | 7/1973 | Patizos | 100/215 |
| 4,018,169 | 4/1977 | Schmalz | 100/215 |
| 4,202,263 | 5/1980 | Schulte | 100/95 |
| 4,444,416 | 4/1984 | Soderstrom | 212/189 X |
| 4,552,062 | 11/1985 | Vezzani | 100/95 |
| 4,660,469 | 4/1987 | Smith et al. | 100/95 |

OTHER PUBLICATIONS

U.S. Shear Machine Co., Sales Brochure for "400–1000 Ton Shear", no date.

*Primary Examiner*—Andrew M. Falik
*Attorney, Agent, or Firm*—William J. Beres

[57] ABSTRACT

A mobile scrap shear machine is comprised of a shear head assembly and a chute which is postionable between a lowered, transport position and a raised operational position. A frame work extends from the shear head assembly and hydraulic lifting assemblies are attached to the shear head assembly and framework so that upon extension of foot pads attached to the hydraulic ram assemblies the machine is lifted and the weight of the chute, the shear head assembly and the framework is borne through the support pads of the hydraulic ram assemblies. In operation, the chute is raised and has a bed which serves to gravity-feed scrap to the shear head assembly. A set of wheels is mounted to the framework and the chute includes a hookup mechanism which can be lowered onto and attached to a truck. When the chute is lowered onto a truck and when the support pads of the hydraulic assemblies are retracted, the weight of the shear machine is transferred to the wheels of the framework and the wheels of the truck. Therefore, during transport, the weight of the shear head assembly is borne at least substantially through the chute and the weight of the shear machine is borne by the framework tires and the tires of the truck which is transporting the machine.

23 Claims, 2 Drawing Sheets

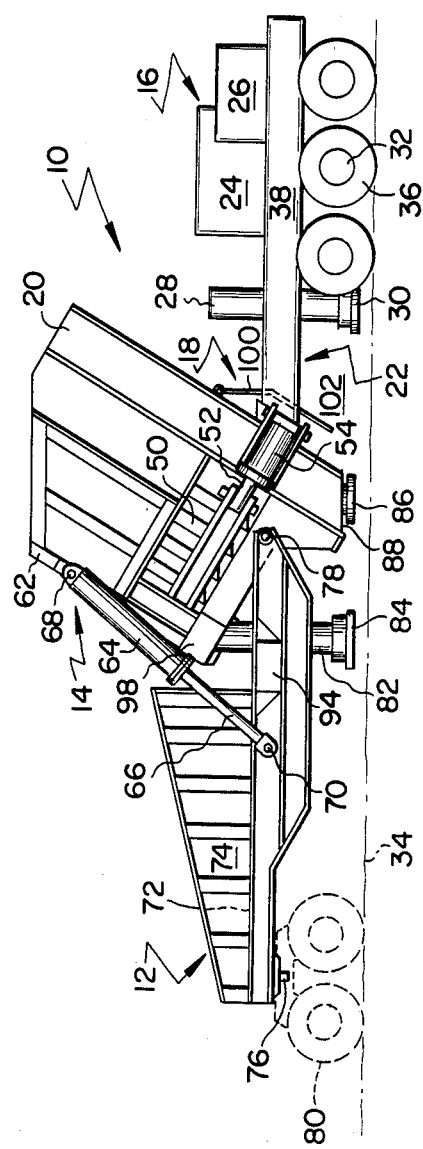
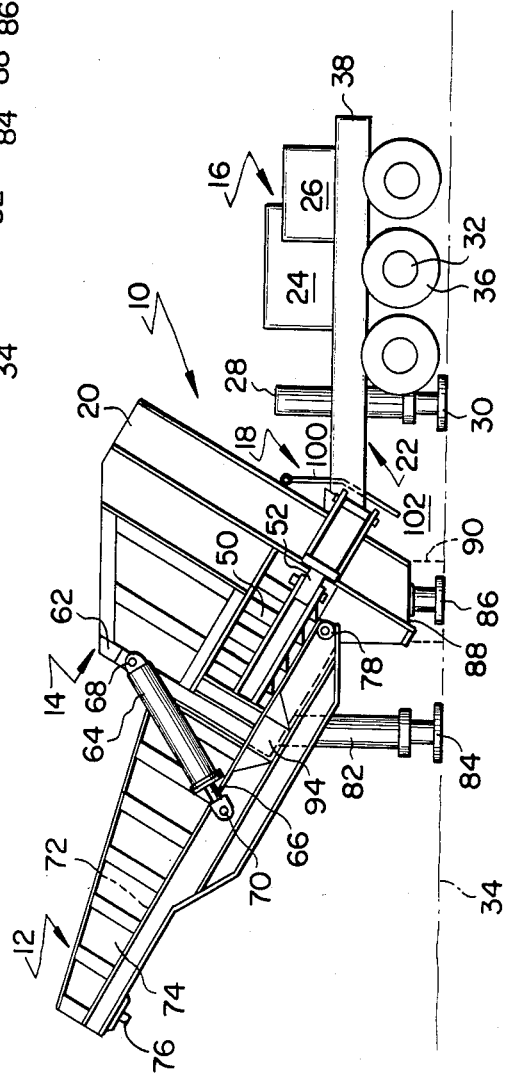

4,782,748

MOBILE SCRAP SHEAR MACHINE

BACKGROUND OF THE INVENTION

This invention relates generally to a machine for shearing scrap metal. More particularly, this invention relates to a scrap metal shear machine in which scrap is bi-directionally compressed prior to shearing and is fed to the shear head assembly by the force of gravity. With still more particularity, the present invention relates to a mobile, gravity fed, hydraulically operated, guillotine type shear machine.

Machines used in the compacting and shearing of bulk scrap materials are massive implements. Such machines are typically shipped piecemeal to the location of their employment where they are assembled and fixedly installed on a substantial foundation and support structure. The foundation and support structure are generally provided separately at the site where the shear machine is to be installed. Typical of such installations are the scrap shearing machines illustrated in U.S. Pat. Nos. 4,202,263 and 4,660,469.

Scrap shear machines are generally employed in scrap yards of considerable acreage and in some instances such machines are required to be disassembled and reassembled at alternate sites either within the same scrap yard or at a scrap yard of a completely different location. The disassembly, movement and reassembly of such shear machines is a time-consuming, arduous and costly process due to the physical size and weight of the individual shear machine components and the need for site preparation, including the fabrication of a new foundation.

Shear downtime, which results from the relocation of a typical machine or the remoteness of a typical machine from the scrap it is intended to process, results in greatly reduced efficiency of the scrap reclaiming operation. Further, the more remote the shear machine is from the bulk of the scrap being processed, the more costly and time consuming it is to physically move the massive amount of scrap which is to be processed from its storage location to the near proximity of the shear machine site. Typically, a shear machine can be expected to process on the order of one hundred tons of scrap in a work day.

The need exists for a scrap shearing machine capable of processing on the order of one hundred tons or more of scrap per day which can quickly and efficiently be moved within a scrap yard or from one scrap yard to another.

SUMMARY OF THE INVENTION

It is an object of the present invention to provide a gravity fed scrap shear machine capable of being transported, without disassembly, to a new location.

It is another object of the present invention to provide a mobile scrap shear machine having integral and retractable weight bearing members which allow for the level positioning of the shear machine on uneven terrain.

It is still another object of the present invention to provide a mobile scrap shear machine, having integral weight bearing members, which includes onboard power and hydraulics so as to provide for the operation of the machine at sites which are remote from sources of power.

It is a further object of the present invention to provide for a mobile scrap shear machine which includes a feed chute positionable in a first or operational position, wherein large amounts of scrap can be staged for gravity feed to the shear head assembly and wherein the weight of the shear head assembly is borne primarily through the shear head assembly, and a second or transport position, wherein the weight of the shear head assembly is at least partially borne for transportation through the chute.

It is a still further object of the present invention to provide a road-transportable mobile scrap shear machine which is integrally capable of being configured for transport by a tractor-truck or for shearing operations, independent of the necessity for the fabrication of a support foundation or other site preparation.

These and other objects of the present invention, which will be appreciated when the following Description of the Preferred Embodiment and the attached drawing figures are considered, are met by a mobile scrap shear machine having strategically located and hydraulically operated support members which are retractable for transport purposes.

The shear machine of the present invention has a large feed chute which is positionable between a transport position in which the bed of the chute is essentially parallel with the terrain on which the shear machine is staged and an operational position in which the feed bed of the chute is inclined and is brought into alignment with the scrap processing bed of the shear head assembly.

In the transport mode of operation, shear support members are retracted and the weight of the entire shear machine, including the shear head assembly, is supported on a first end by a framework having a set of tires and on a second end by the tires of a truck-tractor onto which the chute is lowered.

In the operational position the chute is hydraulically raised and brought into alignment with the processing bed of the shear head assembly after the weight of the shear machine is taken up by the extension of strategically located support members.

In the operational position, the shear head assembly effectively bears the weight of the chute mechanism while in the transport position at least a large portion of the weight of the shear head assembly is borne through and by the lowered chute.

The mobile shear machine of the present invention includes an integral supporting framework as well as an integral power and hydraulic system whereby the machine can be relocated quickly and efficiently to an alternate site having no locally available source of power or hydraulics.

The primary advantage of the scrap shear machine of the present invention resides in its mobility and the resulting ability to position it, independent of the location of power sources to varying locations within a scrap yard, thereby enhancing local access to the machine, or to a scrap yard which is entirely different and remote from a first scrap yard site.

The advantage in being able to quickly move a shear machine in a scrap yard is the resulting improved access to stored scrap. Absent such mobility, scrap must be moved within a scrap yard by truck, crane or bulldozer to the location of the fixed shear machine. This process is slow, costly and energy inefficient.

The advantage of being able to road-transport a large shear machine lies in the elimination of the possible need for multiple machines at different scrap yards or at different scrap sites as well as the elimination of the need to disassemble, transport and reassemble shear machine components.

Another advantage of the present invention lies in its integral ability to level and support itself with respect to somewhat uneven terrain. This feature eliminates the need for costly and time consuming site preparation, including the need for the fabrication of fixed machine supports or foundations.

Still another advantage of the mobile scrap shear machine of the present invention is the availability of joint ownership/rental on a time-share basis of a large and costly machine. This is particularly advantageous to the smaller scrap operation which does not have the financial wherewithal to own and operate a large shear machine of its own.

DESCRIPTION OF THE DRAWING FIGURES

FIG. 1 is a side view of the mobile shear machine of the present invention in the transport position.

FIG. 2 is a side view of the mobile shear machine of the present invention in the operational position.

DESCRIPTION OF THE PREFERRED EMBODIMENT

Figure 5:
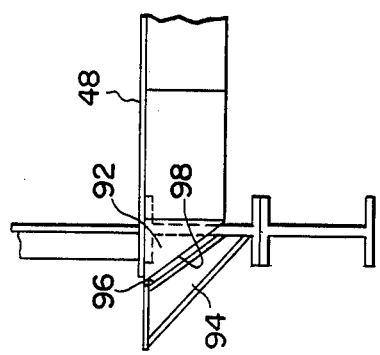
FIG. 5 is a view of the alignment receptacle arrangement of the shear machine of the present invention.

Referring concurrently to all five drawing figures, it will be appreciated that the mobile scrap shear machine of the present invention 10 is comprised of three relatively discrete sections. The first section is chute section 12, the second section is shear head assembly 14 and the third section is power and hydraulics section 16. Power section 16 is fixedly attached to shear head assembly 14 at the location of attachment pads 18, which are disposed on the inclined shear head support columns 20 of the shear head assembly.

Power section 16 includes a framework 22 on which a hydraulic reservoir 24 and a diesel-generator 26 are mounted. Attached to framework 22 is a hydraulic ram assembly 28 which includes a footpad 30. Pad 30 is hydraulically extendable and retractable.

Attached to power section 16 are wheels 32. The extension of foot pad 30 and its contact with support surface 34 causes the load on tires 36 of wheels 32 to be lifted. Tires 36 may be entirely unloaded and lifted off the ground by the controlled extension of the foot pad 30.

Figure 3:
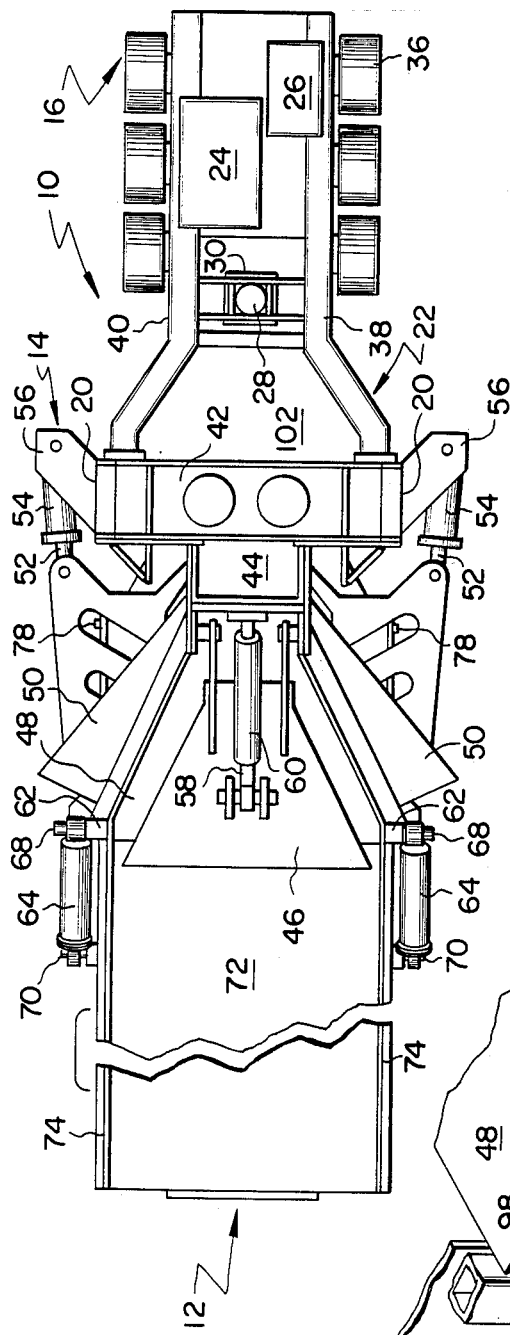
FIG. 3 is a top view of the scrap shear machine of the present invention.

As will be seen in FIG. 3, framework 22 is an open gridwork which includes a first support beam 38 attached to a first of the two shear head support columns 20 and a second support beam 40 which is attached to a second of the two shear head support columns 20.

Beams 38 and 40 are disposed such that a clear and accessible scrap ejection area 100 is defined into which compressed and sheared scrap billets are deposited during the operation of the shear machine.

Ram assembly 28 is disposed between beams 38 and 40 and is positioned generally along the longitudinal axis of the shear machine so as to provide for the cooperative support of the wheels, tires, reservoir and diesel affixed to the beams and, to some extent, of the shear head assembly. Note that by virtue of the positioning of ram assembly 28, reservoir 24, diesel-generator 26, wheels 32 and tires 36 act as counterweights to the weight of the shear head assembly when pad 30 is extended into contact with surface 34. Therefore, a significant portion of the weight of the shear machine 10 of the present invention is evenly balanced and acts vertically downward through ram assembly 28 providing for a very stable structure. It will be remembered, however, that it may be preferrable in some instances to allow the tires 36 to support a portion of the weight of the shear machine in conjunction with ram assembly 28.

Referring primarily now to FIG. 3, shear assembly 14 includes the aforementioned shear head support columns 20 between which a shear head block 42 is disposed. Shear head block 42 incorporates a shear, not shown, which is disposed for shearing action in the shear head block. Behind shear head block 42, along the longitudinal axis of machine 10, is a hold down mechanism 44 which acts to hold compacted scrap material in place and to position such scrap in the shear head block for shearing.

Scrap is compressed bidirectionally in the shear head assembly 14 through the combined action of hydraulically actuated compression wings 50 and a compression flap 46, which acts essentially vertically downward to compress scrap. The action of compression flap 46 is to compress scrap between flap 46 and the processing bed 48 of the shear head assembly.

It will be appreciated that bed 48, as well as shear head block 42 and hold down mechanism 44 are, at all times, inclined irrespective of whether machine 10 is configured for operation or transport. The inclination of bed 48 promotes the gravity feed of scrap to the shear head block.

Scrap is compressed generally horizontally, i.e.: toward the longitudinal axis of the machine, by the operation of pivotally mounted compression wings 50. Wings 50 pivot in the vicinity of the hold down mechanism 44 and are hydraulically driven inward by the extension of piston rods 52 from cylinders 54. Piston rods 52 and cylinders 54 are pivotally attached to wings 50 and support members 56 on the shear head assembly so that the influx of hydraulic oil at high pressure into cylinders 54 causes wings 50 to pivot inward of processing bed 48, laterally compressing any scrap thereon. Compression flap 46 is raised and lowered by the extension and retraction of piston rod 58 from hydraulic cylinder 60.

Attached to support columns 62 of shear head assembly 14 are hydraulic cylinders 64 from which piston rods 66 are extended and retracted. Cylinders 64 are pivotally attached at pivot points 68 to the support columns 62. Piston rods 66 are pivotally attached to chute section 12 at pivot points 70.

Chute section 12 has a feed bed 72 which, when the chute is elevated to the operational position by the retraction of hydraulic piston rods 66, aligns and becomes generally coplanar with processing bed 48 of the shear head assembly so as to form an essentially unitary inclined working bed between the chute section side walls 74.

Chute section 12 includes a hook up mechanism 76 which is configured for the quick attachment of a truck of other motive power to it and is pivotally attached to shear head assembly 14 at pivot points 78.

In the transport position, chute section 12 is lowered by the extension of piston rods 66 from cylinders 64. The chute feed bed 72 is generally parallel to the supporting surface 34 when in the transport position. In the operational position, chute section 12 is raised by the retraction of piston rods 66 into cylinders 64.

The raising of chute section 12, as earlier mentioned, creates an essentially coplanar, unitary working bed comprised of shear head assembly processing bed 48 and chute feed bed 72. The essentially unitary working bed is inclined so that scrap loaded into chute section 12 tends to be self-fed into shear head block 42 by the force of gravity.

It will be appreciated that while being transported, the weight of shear machine 10 will be borne entirely by the tires 36 of power section 16 and the tires 80 of the truck connected to hook up mechanism 76 of chute section 12. Tires 80 are shown in phantom in FIG. 1. In the operational position, however, the weight of the chute section and at least a portion of the shear head assembly must otherwise be borne.

In the preferred embodiment, at least one, but preferably two, hydraulically operated ram assemblies 82 are attached to the underside of feed bed 48 of the shear head assembly. Ram assemblies 82, one of each of which is found on either side of the longitudinal axis of the shear machine, each include a support pad 84 that, upon extension, contacts machine supporting surface 34, which is typically unprepared but relatively flat ground. Ram assemblies 82 therefore take up the weight of at least a portion of the shear head assembly and that of chute section 12. It will be appreciated then, that in the operational position of the preferred embodiment, the entirety of the weight of chute section 12 is borne through shear head assembly 14.

While not mandatory, shear head assembly 14 can also include one or more hydraulically extending support pads 86 located generally under the hold down mechanism and shear head block portions of the shear head assembly. It will be appreciated that the bulk of the weight and the center of gravity of the machine will be located generally above support pads 86 of the shear head assembly. In the absence of support pads 86, or even if support pads 86 are provided, a support surface 88 is provided at the base of the shear head assembly which may be brought to rest upon support blocks, such as the block 90 which is shown in phantom in FIG. 2. Support blocks 90 are entirely independent of shear machine 10 and will typically be wood and/or concrete blocks.

It should be appreciated that by controllably and individually extending support pads 30, 84 and 86 (if provided) into contact with support surface 34, the weight of machine 10 is supported in a fashion which permits the quick setup of machine 10 for operation on somewhat uneven terrain in a very efficient and stable fashion.

It is to be noted that the alignment of chute 12 with shear head assembly 14 is critical to the operation of machine 10. If such alignment is not achieved, scrap loaded into chute section 12 can hang up and fail to be advanced by gravity onto processing bed 48 of the shear head assembly. In order to ensure such alignment, shear head assembly 14 includes geometrically configured alignment pads which, when in operation, are received into geometrically cooperating receptacles defined by chute section 12.

Figure 4:
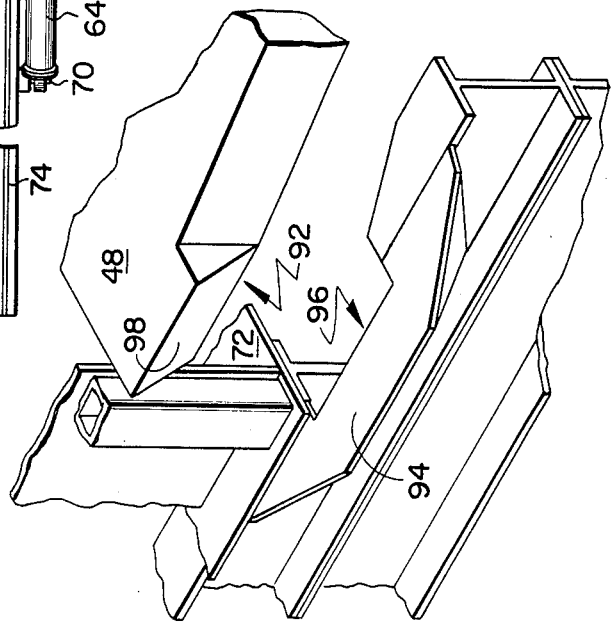
FIG. 4 is a perspective view of the apparatus by which the feed bed of the chute section of the machine of the present invention is caused to be aligned with the processing bed of the shear head assembly section thereof.

Referring primarily now to FIGS. 4 and 5, it will be seen that at the sides of bed 48 of the shear head assembly there exist geometrically configured alignment pads 92 which are cooperatively received into receptacles 94 of chute section 12. As chute section 12 is raised to the operational position, inclined surface 96 of receptacle 94 comes into contact with a cooperating inclined surface 98 of alignment pad 92. The inclined and cooperating natures of the surfaces 96 and 98 cause the generally coplanar alignment of feed bed 72 of chute section 12 with processing bed 48 of shear head assembly 14 as piston rods 66 are retracted into cylinders 64.

In operation, scrap is loaded into chute section 12 from where it is fed by force of gravity onto processing bed 48 of the shear head assembly. Once staged by gravity onto bed 48, the scrap is bidirectionally compressed by the dual action of compression flap 46 and compression wings 50.

Once compressed, the scrap is fed into the area of hold down mechanism 44 and shear head block 42 of the shear head assembly. The scrap is further advanced by gravity such that a portion of the now compressed bulk scrap is fed past the shear head block 42 until it is stopped by hydraulically operated gate 100. Gate 100 is positioned so as to stop the advance and feeding of the compressed bulk scrap past shear head block 42 in a manner which gages the length of the scrap portion to be sheared.

The shear, not shown, then cycles so as to sever the gaged portion of compressed scrap. Door 100 then opens and the sheared block of compressed scrap falls generally into the area 102 vertically beneath the inclined shear head block. The sheared block of compressed scrap can be removed by conveyor, forklift or in any other suitable fashion.

At such time as the shear machine 10 is to be transported, chute section 12 is lowered onto a tractor-truck which is prepositioned to connectably receive hook-up mechanism 76. Support pads 30 and 84, as well as 86, if provided, are hydraulically retracted and the weight of the machine, including the shear head assembly, is transferred to and taken up by the tires of the truck and the tires of the power section 16. The weight of the shear head assembly is therefore borne at least substantially through the chute section when machine 10 is configured for transportation. The machine is then driven to a new location.

It will be appreciated that many modifications to the invention will be apparent to those skilled in the art which will go to achieving like results. Therefore, the scope of the invention is to be limited only in accordance with the language of the claims which follow.

What I claim is:

1. A scrap shear machine comprising:

shear head assembly means, said shear head assembly means including an inclined scrap processing bed;

chute means having a scrap feed bed and being positionable between a first position wherein said feed bed is essentially coplanar with said processing bed and a second position wherein said feed bed is lowered out of said coplanar relationship with said processing bed;

means for positioning said chute means between said first position and said second position;

means for transportably supporting the weight of said shear head assembly means; and means substantially independent of said means for transportably supporting said shear head assembly means, for directly supporting the weights of both said shear head assembly means and said chute means when said chute means is in said first position.

2. The scrap shear machine according to claim 1 wherein the weight of said chute means is at least primarily borne through said shear head assembly means when said chute means is in said first position and wherein the weight of said shear head assembly means is at least partially supported for transport through said chute means.

3. The scrap shear machine according to claim 2 wherein said chute means is pivotally attached to said shear head assembly means, said machine further comprising means for aligning said scrap processing bed with said scrap feed bed.

4. The scrap shear machine according to claim 3 wherein said machine further comprises framework means attached to and extending from said shear head assembly means on the side of said shear head assembly means opposite the side on which said chute means is disposed.

5. The scrap shear machine according to claim 4 wherein said means for aligning comprises receptacle means on said chute means and alignment pads on said shear head assembly means, said alignment pads having a surface cooperating with a surface of said receptacle means so that as said chute means is positioned into said first position said feed bed and said processing bed are urged into coplanar alignment.

6. The scrap shear machine according to claim 5 wherein said means for supporting the weight of said chute means and said shear head assembly means when said chute means is in said first position comprises means for hydraulically lifting said shear head assembly means, said chute means and said framework, the weight of said chute means being borne by said shear head assembly means through said means for positioning said chute means and the pivot points at which said chute means is attached to said shear head assembly means.

7. The shear machine according to claim 6 wherein said means for hydraulically lifting comprises at least one hydraulic ram assembly attached to said shear head assembly means and at least one hyraulic ram assembly attached to said framework means, said hydraulic ram assemblies acting vertically downward and including support pads for contacting the surface on which said machine is located.

8. The scrap shear machine according to claim 7 wherein said means for transportably supporting the weight of said machine comprises a plurality of wheels and tires, at least a portion of said plurality of said wheels and tires being mounted on said framework means.

9. A mobile shear machine comprising:
chute means, having a feed bed and being positionable between a first position, wherein said feed bed is inclined with respect to the horizontal, and a second position wherein said feed bed is essentially horizontal with respect to the surface said shear machine is on, for staging scrap for processing;
means for positioning said chute means between said first and second positions;
a shear head assembly having a fixed, inclined scrap processing bed, said processing bed being in an essentially coplanar relationship with said feed bed when said chute means is in said first position; and
means for transportably bearing the weight of said shear machine, a substantial portion of the weight of said shear head assembly being borne through said chute means when said machine is transported.

10. A mobile shear machine according to claim 9 wherein said shear head assembly bears a substantial portion of the weight of said chute means when said chute means is in said first position.

11. The mobile shear machine according to claim 10 further comprising means for aligning said feed bed of said chute means and said processing bed of said shear head assembly; and, a framework extending from said shear head assembly, said shear head assembly and said framework each having a hydraulic ram assembly, said hydraulic ram assemblies each having a support pad, the extension of said pads into contact with the surface on which said machine is located lifting said shear head assembly, said chute means and said framework so that at least the majority of the weight of said chute means is borne by said hydraulic ram assemblies through said shear head assembly.

12. The mobile shear machine according to claim 11 wherein said means for aligning comprises a plurality of receptacles on said chute means and a plurality of cooperating alighment pads on said shear head assembly.

13. The mobile shear machine according to claim 12 further comprising a plurality of wheels attached to said framework and hookup means attached to said chute means.

14. A road-transportable shear machine comprising:
a shear head assembly for processing scrap, said assembly including a processing bed fixedly positioned to deliver scrap to a shear in said assembly by force of gravity;
chute means for feeding scrap by force of gravity to said shear head assembly when in a first position and for at least partially bearing the weight of said shear head assembly when said machine is being transported;
means for supporting the weight of said machine when said machine is in operation, said means for operationally supporting the weight of said machine including means for supporting at least a substantial portion of the weight of said chute means through said shear head assembly; and
means for transportably supporting the the weight of said machine, said means for transportably supporting being substantially independent of said means for operationally supporting the weight of said machine and including means for supporting at least a substantial portion of the weight of said shear head assembly through said chute means during the transport of said machine.

15. The shear machine according to claim 14 further comprising means for positioning said chute means between a transport position wherein said chute means is lowered with respect to said shear head assembly and an operational position wherein said chute means is raised and provides an inclined feed bed by which scrap is fed to said processing bed of said shear head assembly.

16. The shear machine according to claim 15 further comprising means for bringing said chute means and said shear head assembly into coplanar alignment when said chute means is raised into said operational position.

17. The shear machine according to claim 16 further comprising a framework extending from said shear head assembly and wherein said means for operationally supporting said shear machine comprises means, attached to said framework and to said shear head assembly, for hydraulically lifting the weight of said machine.

18. The shear machine according to claim 17 wherein said means for transportably supporting the weight of said machine comprises a plurality of wheels attached to said framework and a truck onto which said chute means is lowered, the entire weight of said shear head assembly being borne through said chute means and said framework when said hydraulic assemblies are retracted.

19. A scrap shear machine comprising:
  a shear head assembly having a fixed inclined scrap processing bed;
  a chute pivotally attached to said shear head assembly and having a scrap feed bed;
  means, attached to said shear head assembly and to said chute, for positioning said chute between a first position in which said feed bed is in a coplanar relationship with said processing bed and a second position wherein said feed bed is essentially parallel to the surface on which said machine is supported;
  means for substantially bearing the weight of said shear head assembly and said chute means when said chute means is in said first position so that the weight of said chute means is borne through said shear head assembly; and
  framework means, attached to said shear head assembly, and having means for at least partially bearing the weight of said shear head assembly and said chute means when said chute means is in said first position, for supporting said shear head assembly and said chute means, when said chute means is in said first position, in a manner which is fixed and stable with respect to the surface on which said machine is located.

20. The scrap machine according to claim 19 wherein said means for substantially bearing the weight of said shear head assembly and said framework means bears the weight of said shear head assembly and said chute means in a manner so that said weight can be transferred to substantially independent second means for bearing the weight of said shear head assembly and said chute means.

21. The scrap machine according to claim 20 wherein said substantially independent second means comprise means for transportably bearing the weight of said machine, the weight of said shear head assembly being at least substantially borne through said chute means when the weight of said machine is transferred to said means for transportably supporting the weight of said machine.

22. The scrap machine according to claim 21 wherein said machine further comprises means for aligning said processing bed and said feed bed.

23. The scrap machine according to claim 22 wherein said means for aligning comprises a receptacle and an alignment pad.

* * * * *